United States Patent [19]

Campbell

[11] 4,307,294
[45] Dec. 22, 1981

[54] ELECTRO-MECHANICAL CONTROL MEANS FOR SPACE COMMUNICATION RECEIVER

[76] Inventor: Duncan B. Campbell, 312 Peach Grove La., Santa Barbara, Calif. 93105

[21] Appl. No.: 127,194

[22] Filed: Mar. 4, 1980

[51] Int. Cl.³ ............................................. G01J 1/20
[52] U.S. Cl. ........................... 250/201; 455/619
[58] Field of Search ............... 250/201, 204, 208, 209; 354/25; 455/617, 619, 602; 369/44, 45

[56] References Cited

U.S. PATENT DOCUMENTS 4,128,847 12/1978 Roullet et al. ..................... 250/201
4,254,330  3/1981 Stauffer et al. .................... 250/204

*Primary Examiner*—David C. Nelms
*Attorney, Agent, or Firm*—Ralph B. Pastoriza

[57] ABSTRACT

A free space communication receiver including a lens and a photodetector spaced along the optical axis of the lens is provided with a drive for changing the distance between the lens and photodetector to thereby shift the focal point of radiation passing through the lens relative to the photodetector. A signal level detector provides an output signal level in response to the signal from the photodetector. A logic control such as a microprocessor is connected between the signal level detector and the drive for the lens. Provided that the output signal level is below a given high threshold signal level, an automatic self-focus operation takes effect, wherein as the drive moves the focal point of the lens closer to the photodetector, the resulting increase in the output signal level maintains the operation of the drive through the logic control or microprocessor until such time as the focal point coincides with the photodetector. Further movement by the drive results in defocusing and a decrease in the signal. This decrease in the signal is detected and automatically reverses the direction of the drive so that an automatic sensing of the peak signal results. This basic automatic self-focus control works in conjunction with attenuation networks to provide a very wide range automatic gain control for the entire system. Moreover, the self-focus feature compensates for changes in the lens focal length as a result of variations in ambient temperature.

9 Claims, 2 Drawing Figures

ELECTRO-MECHANICAL CONTROL MEANS FOR SPACE COMMUNICATION RECEIVER

This invention relates generally to free space communication systems and more particularly to a space communication receiver utilizing an optical lens and photodetector.

BACKGROUND OF THE INVENTION

In the design of optical communication systems, several problems must be addressed and solved simultaneously. While each of these problems could be solved independently with conventional techniques, such solutions interact so as to make the overall problem extremely difficult.

Examples of some of the foregoing problems and presently known prior art solutions follow:

Temperature Compensation of Plastic Fresnel Lenses

In optical communication systems, as with other forms of electromagnetic communication, the size of the receiving antenna or lens in terms of the wavelength of emission should be made as large as is practical. Large size not only increases the strength of the receiver signal but reduces the reception angle (optical field of view) so as to eliminate extraneous noise and thereby enhance the signal to noise ratio.

Lenses and mirrors made from glass are preferable but their cost and weight become impractical in diameters above a few inches.

In contrast, the plastic Fresnel lenses are relatively light and can be easily fabricated in much larger diameters without loss of accuracy. However, plastic Fresnel lenses are inherently unstable with changes in temperature.

If used in an optical communication system, a few degrees change in temperature can result in a substantial change in the focal length of the Fresnel lens resulting in defocusing of the received radiation on a photodetector or other electromagnetic radiation detecting device.

This particuar problem has been solved in the past by simply providing temperature compensating mountings wherein a change in temperature will expand or contract a mounting element to physically move the Fresnel lens in a manner to maintain its focal point on the particular detector. Sometimes creep disks or bellows along with a secondary lens have been used for effecting the desired compensation.

In addition to the above techniques, it has also been proposed to use lead screws to move the Fresnel lens in response to changes in temperature. Basically, the temperature of the lens and the position of the lens is measured with thermistors and a position potentiometer respectively. If there is a difference between the measured position and the required position for a given temperature, a motor moves the lens by way of the lead screws until the difference in position is brought to zero.

While the foregoing techniques will solve the particular temperature compensation problem involved with Fresnel lenses, they not only are somewhat costly and difficult to install but they also "lock in" the relationship between the optical lens and detector so that a certain flexibility in overall control is lost.

Automatic Gain Control

As noted heretofore, by providing a relatively large optical lens diameter, there is a large ratio of antenna size to the wave length of emission providing for increased received signal strength and a substantial narrowing of the field of view of the receiver. As a consequence, the optical systems are characterized by a very large range of incoming optical signal power on the receiver. Accordingly, the receiver must be capable of handling a very large range of signals without distortion.

As a result of the above, there is required some means to control or limit the range of signal strength and such means is referred to as automatic gain control or AGC. It is not uncommon to need more than 100 db of AGC action to handle the variation in signal strengths needed for operation at close range under clear conditions to long-range under foggy conditions.

One technique for providing a fairly wide range of automatic gain control is to provide a motorized iris between the lens and the photodetector. Since it acts on the optical portion of the signal, it does not degrade the signal to noise ratio.

Another approach is to use electronic automatic gain control roughly analogous to that used in conventional amplitude modulated radio signals. The maximum automatic gain control range attainable by such electronic control is of the order of 20 db per stage which is actually less than that attainable with a mechanical shutter.

Solar Protection

If an optical communication system is mounted on two buildings of significantly different heights, the potential exists that the sun will pass through the field of view or beam divergence of the receiver or transmitter, thus producing a "burning glass" effect on the components at the focal point of the lens.

To avoid the above type of problem, prior art systems have proposed either a mechanical blockage of the solar light or a reflection or absorption of the visible portion of the light spectrum.

A disadvantage of the mechanical approach is that a shutter must be reopened periodically in order to test for solar irradiance. In other words, if the shutter is utilized to block out potential sunlight during certain periods, the system remains inactive during such periods.

Reflecting light, such as by means of a dichroic mirror is another solution but if such a mirror is placed in front of or just immediately behind the Fresnel lens, it must be of substantial size and the cost of the mirror would be prohibitive.

Absorptive filters usable at the plane of the Fresnel lens are feasible since they can be formed of acrylic plastics. On the other hand, the very act of absorption of visible light by such absorptive filters heats the plastic to a temperature where it may sag.

Defrosting and Defogging

Condensation of moisture on the lens occurs when the temperature drops to a point that the relative humidity exceeds 100%. If the temperature continues to drop near the freezing point, such condensation will freeze causing frost.

To prevent condensation and frosting, for temperatures between 0° C. and 40° C., the temperature of the optical surfaces should be maintained 10° above the ambient temperature. At ambient temperatures below 0° C. the optical surfaces should be held at +5° to +10° C. For temperatures above 40° C., no heating of the optical surfaces would be required.

Presently known techniques for solving the above problem involve either localized heating of the Fresnel lens or an overall heating of the entire instrument. Heating the Fresnel lens itself is a comparatively simple and direct approach. However, when such localized heating is used, there is no guarantee that the temperature of the Fresnel lens will be the same as the temperature of the compensating components such as acrylic rods and the like utilized in present day temperature compensating techniques as described heretofore. There is thus a cross or interaction and if a desired temperature profile is to be followed, inaccuracies in the temperature compensating system can result.

Where the entire interior of the instrument is heated, there is the disadvantage that certain components in the system act unfavorably under such heated conditions.

In addition, the brute force approach of heating the entire enclosure can become costly.

Alignment Problems

In order for presently known optical receiver systems to be properly aligned, a skilled technician is required. Involved are the simultaneous adjustment of three variables which interact, to wit: azimuth, elevation and focus. The adjustments must be in exactly the right sequence.

The prior art does not offer any means for simplifying this alignment problem.

Misalignment Problems

When an optical receiver is aimed directly at the transmitter (on axis condition), and is "in focus" a very high signal strength or sensitivity results. This sensitivity drops off rapidly when the system is angularly displaced (off axis condition). Thus, any misalignment beyond the field of view of the receiver which can be caused inadvertently such as by a building shift or a high wind condition, can result in the signal dropping off sharply below the range of satisfactory operation.

One proposed prior art solution is to utilize a servo mechanism which moves the photodetector in the focal plane of the lens so as to keep the receiver automatically aimed at the transmitter. Such automatic control system, however, is relatively expensive and normally would not be warranted unless the inadvertent movement to an out-of-axis condition happened frequently because of uncontrollable environmental conditions.

BRIEF DESCRIPTION OF THE PRESENT INVENTION

With all of the foregoing considerations in mind, the present invention basically proposes techniques which solve substantially all of the foregoing-encountered problems simultaneously and at a substantially less cost than is required by independent prior art techniques addressed to each of the problems individually.

More particularly, and in its broadest aspect, the present invention provides a drive means for changing the distance between a Fresnel lens and photodetector as measured along the optical axis to thereby shift the position of the focal point of radiation passing through the lens relative to the photodetector. A signal level detecting means provides an output signal level in response to the photodetector signal and a logic control means in turn is connected between the signal level detecting means and the drive means. The logic control means is basically responsive to the output signal level to operate the drive means in a direction to move the focal point of the lens closer to the photodetector to increase the photodetector signal and thereby increase the output signal level. This "self-focus subroutine means" continues to operate the drive means in the same direction until the output signal level starts to decrease, at which point the drive means is operated in a reverse direction so that basically the drive means automatically focuses the radiation from the lens onto the photodetector by seeking the peak signal. The result is that there is provided a maximum output signal to noise ratio so long as the output signal level is below a given high threshold signal level defined within the logic control means.

The above technique immediately solves the problem of temperature sensitive Fresnel lenses in that a change in the focal length of the Fresnel lens as a consequence of a change in temperature is immediately compensated for by operation of the drive means which functions to always maintain the system in focus by maximizing the received signal.

In addition, the foregoing electro-mechanical control of the distance between the lens and photodetector is used in the present invention in conjunction with automatic gain control circuits for greatly increasing the overall range of the automatic gain control. Such is accomplished by defocusing the radiation on the photodetector by operation of the drive means where the detected output signal level continuously exceeds a given high threshold signal level even after the normally provided electronic attenuators are operating at their maximum.

The "auto-focus subroutine means" further solves the problem of defrosting and defogging the lens since any interaction between a localized heating of the lens and the temperature sensitiveness of the lens is automatically again compensated for by the automatic focusing.

A single microprocessor or logic control can be utilized for controlling the drive means as well as the defogging and defrosting mechanism and also the same can cooperate with a solar protector device which will operate the drive means to defocus the radiation on the photodetector in the event the receiver intercepts solar energy.

Finally, various alignment and misalignment problems discussed with respect to the prior art are greatly simplified by the present invention and particularly the self-focus subroutine technique employed.

BRIEF DESCRIPTION OF THE DRAWINGS

A better understanding of this invention as well as further features and advantages thereof will be had by now referring to the accompanying drawings in which.

DETAILED DESCRIPTION OF THE PREFERRED EMBODIMENT

Figure 1:
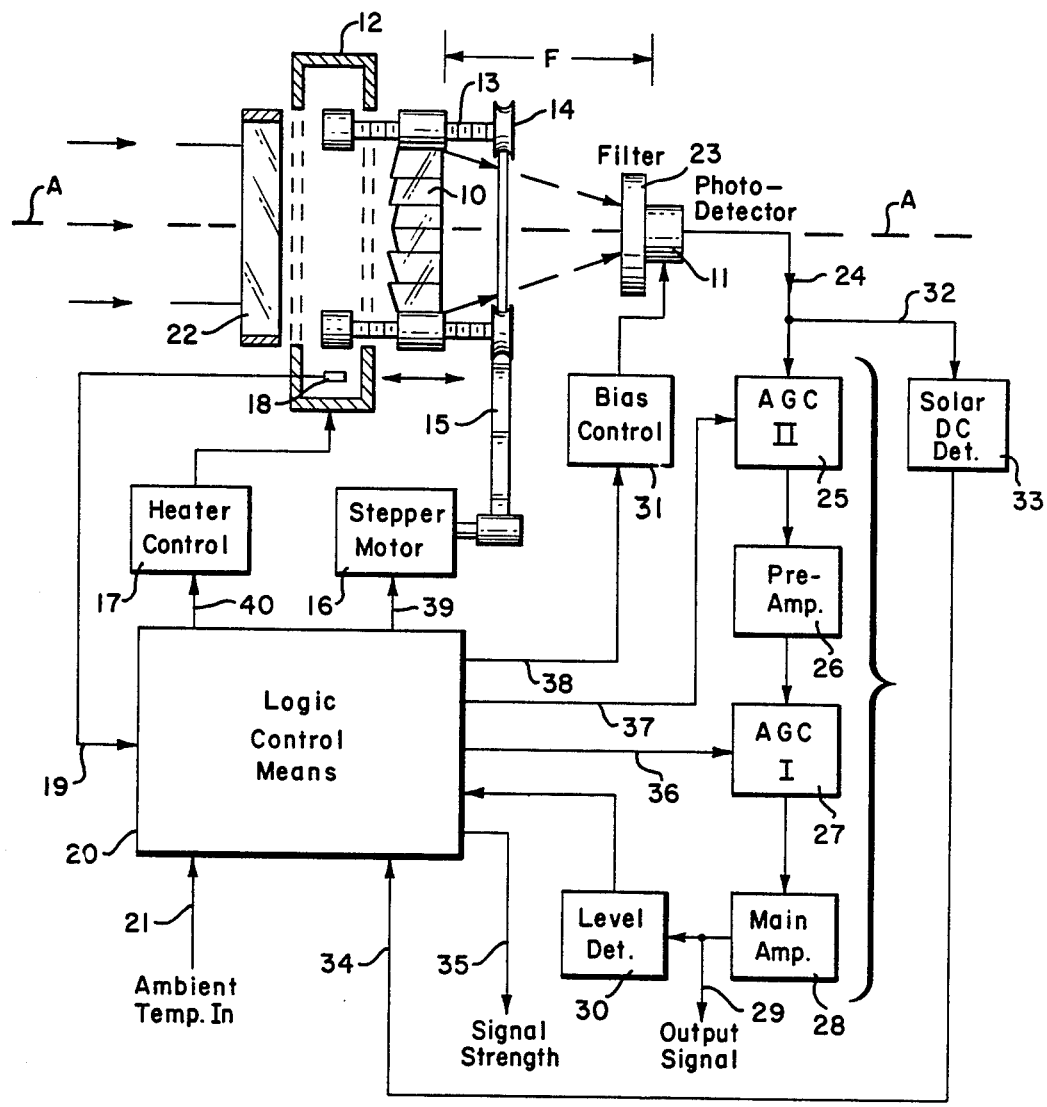
FIG. 1 is a schematic diagram partly in block form of the electro-mechanical control system of this invention; and, FIG. 2 is a plot of signal sensitivity for in-focus and out-of-focus conditions as a function of off-axis displacement useful in explaining certain features of the present invention.

Referring first to the upper left portion of FIG. 1 there is shown a space communication receiver including a lens 10 serving as an optical antenna. The lens 10 is of the Fresnel type, made of plastic. A photodetector 11 is shown spaced from the lens 10 along the optical axis A—A of the lens.

A lens heating frame is schematically depicted at 12 in front of the Fresnel lens 10. The purpose for this heating frame will be described in greater detail subsequently.

In accord with a first important feature of this invention, there is provided a drive means for changing the distance between the lens 10 and photodetector 11 as measured along the optical axis A—A. This drive means is schematically depicted as comprising lead screws such as indicated at 13 rotatable by appropriate drums such as 14 and a cooperating belt 15 operated by a stepper motor 16. Stepper motor 16 is responsive to discrete pulses to move the lens closer to or further from the photodetector 11. In this respect, it should be understood that the photodetector 11 could be moved relative to the lens 10, the important function being that the distance between the lens and detector can be changed.

The significance of the foregoing drive means is twofold. First, if the focal length indicated at F in FIG. 1 should change as a consequence, for example, of a change in temperature which would deform the Fresnel lens 10, the position of the new focus point can readily be moved to coincide with the photodetector 11. In other words, the drive means can be utilized to automatically maintain the photodetector always at the focal point of radiation passing through the lens 10 even though the focal length should change. Second, a deliberate defocusing of the radiation falling on the photodetector 11 can be accomplished by moving the lens 10 closer to the photodetector so that the effective focal point or focus falls behind the photodetector. This defocusing action essentially decreases the photodetector signal since it spreads the radiation intercepted by the photodetector.

Referring once again to the heater frame 12, this frame is under control of a heater control shown by the block 17 and functions as a defogging and defrosting device. Towards this end, there is provided a temperature sensor 18 connected by way of lead 19 into a logic control means designated generally by the arrow 20. An ambient temperature input 21 also passes into the logic control means 20. The front portion of the Fresnel lens 10 is closed off by a window 22 so that the air between the window 22 and front of the lens 10 is heated by the heater frame 12, under control of the temperature sensor. The manner in which defogging and defrosting takes place will be described in detail subsequently.

A band pass filter indicated at 23 is provided in front of the photodetector 11 to block out non-actinic electromagnetic radiation so as to increase the signal to noise ratio of the photodetector signal.

The output of the photo-detector in the form of a photodetector signal is passed along output lead 24 to an automatic gain control network 25, thence a pre-amplifier 26 and another automatic gain control network 27 and thence to a main amplifier 28. An output signal is taken from the main amplifier as indicated at 29 and the level of this output signal is detected by a signal level detecting means indicated by the block 30. This signal level detecting means feeds an output signal level to the logic control means 20. Where this logic control means incorporates a microprocessor, the input analog signal from level detector 30 as well as other analog signals would be converted by appropriate analog to digital converters into digital signals.

The automatic gain control networks such as indicated at 25 and 27, as will also become clearer as the description proceeds, function in cooperation with a bias control indicated by block 31 connected between the photodetector 11 and the logic contol means 20. Bias control 31 will function to bias the photodetector to decrease its gain if it is desired to diminish the photodetector output signal on lead 24.

The photodetector signal on lead 24 is passed by a branchlead 32 to a solar energy protection means indicated by the block 33. Basically, the solar energy protection means 33 is responsive to the d-c component of the photodetector signal on lead 24 and passes a d-c level along output lead 34 to the logic control means 20.

Output control signals from the logic control means 20 are provided on leads 35 to indicate the signal strength received in the logic control means from the signal level detector 30, leads 36 and 37 to the automatic gain control networks 27 and 25 respectively, lead 38 to the bias control 31, lead 39 to the stepper motor 16 and lead 40 to the heater control 17.

The logic control means 20 provides a feedback loop between the output signal level from the signal level detecting means 30 and the stepper motor 16 for the drive means such that provided that the output signal level from detector 30 is less than a given high threshold signal level defined by the logic control means, the stepper motor 16 will be actuated to move the lens in a direction which will maximize the output signal level by maximizing the photodetector signal. Maximization of the photodetector signal is accomplished when the focal point of the lens 10 falls precisely on the photodetector 11. Thus, as the signal level from the signal level detector 30 increases, it continues to operate the stepper motor 16 to move the focal point of the radiation closer to the photodetector 11 which action in turn increases the photodetector signal and thus continues to increase the output signal level from the level detector 30. When the focal point passes the photodetector 11, the photodetector signal will immediately start to decrease and this decrease will be reflected in the output signal level to the logic control means from detector 30 to reverse the stepper motor 16. Basically, the drive means in the form of the stepper motor thus functions to seek the peak of the photodetector signal so that an automatic focusing of the radiation on the photodetector is assured.

As mentioned, the logic control means 20 defines a given high threshold signal level. If the output signal level from the level detector 30 passed into the logic control means exceeds this high threshold signal level, the logic control means will provide an appropriate signal to the attenuators 27 and 25 by way of leads 36 and 37 which make up an attenuator network means to attenuate the photodetector signal until the output signal level falls below the referred to given high threshold signal level. This automatic gain control operates in two stages. First, the automatic gain control 27 is controlled to attenuate the output signal from the pre-amplifier 26. When maximum attenuation is introduced into the automatic gain control network 27 and the output signal level is still above the given high threshold signal level, then an appropriate signal from the logic control means operates the automatic gain control network 25 to attenuate the photodetector signal directly before passing into the pre-amplifier 26. After maximum attenuation has been introduced by the attenuator 25, if the output signal level is still above the high threshold signal level, a signal is provided on lead 38 from the logic control means to operate the bias control 31 and reduce the gain of the photodetector 11. In other words, the bias control means is only responsive to an increase in the output signal level above the high threshold signal level after maximum attenuation has been introduced by the two attenuators 27 and 25.

Logic control means 20 also includes appropriate means for controlling the stepper motor 16 constituting part of the lens drive means to effect automatic defocusing of the radiation on the photodetector 11 in the event that the output signal level received in the logic control means still exceeds the given high threshold signal level after maximum attenuation has been introduced and after maximum bias to minimize the gain of the photodetector has been introduced. The drive means thus functions in cooperation with the attenuating networks as a part of the overall automatic gain control since a substantial reduction in the photodetector gain can be realized by defocusing the radiation falling on the photodetector. Thus, the stepper motor will move the lens 10 closer to the photodetector 11 to spread out the radiation falling on the photodetector and thereby decrease the photodetector signal. This decrease will be reflected in a lowering of the output signal level from the detector 30 and as soon as this output signal falls below the high threshold signal level, then the stepper motor will no longer move the lens.

From the foregoing, it can thus be seen that there is a very wide range of automatic gain control particularly when the self-focus drive means feature can be overriden by the logic control means after other automatic gain control means have been exhausted to effect the desired automatic gain control.

Logic control means 20 also defines a low threshold signal level such that should the output signal level from the detector 30 fall below this given low threshold signal level, a reverse action takes place in order to increase the output signal level. Thus, assuming that the drive means has defocused the radiation on the photodetector and that maximum attenuation and bias control has been introduced as described heretofore, if the signal strength starts to decrease as a consequence of a weakening signal or falling off of the radiated signal in space, the first operation of the logic control means is to move the lens in a direction to maximize the output signal from the photodetector which action will occur when the photodetector is at the proper focal point of the lens. After this action has taken place, if the output signal level from the detector 30 received in the logic control means is still below the low threshold signal level, signals on the lead 38 will change the bias control 31 to increase the gain of the photodetector and thereby increase the photodetector output signal. This action will be reflected in the logic control means and if the output signal level is still below the given low threshold signal level, then the attenuation networks 25 and 27 will successively be controlled to remove as much attenuation of the signal as necessary in order to bring the output signal level above the given low threshold signal level.

It can thus be seen that the output signal level at 29 is controlled to lie within a signal band defined by the given high and low threshold signal levels in the logic control means 20.

The drive means in the form of the stepper motor which changes the distance between the lens 10 and photodetector 11 thus provides for additional advantages. Not only will this drive means provide for the automatic self-focus subroutine maintaining proper focus at all times but will also operate in conjunction with the automatic gain control attenuators and bias control as already described to aid in attenuating the signal where a very high signal strength occurs.

The same drive control is also useful in preventing solar damage to the components of the receiver. In this respect, the logic control means defines a given d-c level which if exceeded by the d-c component detected by the solar detector 33 and passed to the logic control means by lead 34, will operate the bias control 31 to reduce the gain of the photodetector 11. If the reduction in gain of the photodetector 11 is not sufficient to reduce the d-c component of the photo-detector on lead 24 below the given d-c level established by the logic control means, then the stepper motor 16 will be operated to defocus the radiation of the photodetector and thus reduce the photodetector output signal on line 24 and thus its d-c component.

In other words, the drive means becomes very useful for protecting the photodetector and other components from solar radiation by defocusing the radiation passed to the photodetector.

Considering now the operation of the heater frame 12 and associated heater control 17, temperature sensor 18 and inputs 19 and 21 to the logic control means 20, these components function essentially to maintain a given temperature profile for the Fresnel lens 10 so as to avoid moisture condensation on the lens and thus prevent fogging and frosting of the lens.

More particularly, the logic control means 20 is responsive to the ambient temperature on input 21 and the sensed temperature on lead 19 from temperature sensor 18 to operate the heater control 17 in a manner to maintain a given relationship between the sensed temperature at the lens and the ambient temperature corresponding to the referred to desired temperature profile. In this respect, the logic control means will control the heater such that at temperatures above 40° C. no heating of the optical surfaces by the heater frame 12 occurs. Between 0° C. and 40° C. the temperature of the optical surfaces is maintained 10° above ambient, and at ambient temperatures below 0° C. the optical surfaces are held at between +5° and +10° C. This temperature profile is readily programmed into the logic control means 20.

As mentioned heretofore, any change in the focal length of the Fresnel lens 10 as a consequence of temperature variations resulting either from the heater 12 or changes in the ambient temperature are automatically compensated for by the self-focus subroutine means described wherein the lens is moved by the stepper motor in an appropriate direction to maintain the focal point at the photodetector 11 so long as the output signal level is within the signal band defined by the given high threshold signal level and low threshold signal level established by the logic control means.

It will be appreciated, accordingly, that defrosting and defogging problems are readily solved as a consequence of not having to worry about interactions with the temperature sensitive Fresnel lens. The advantages in simplicity of local heating of the lens is thus realizable.

Figure 2:
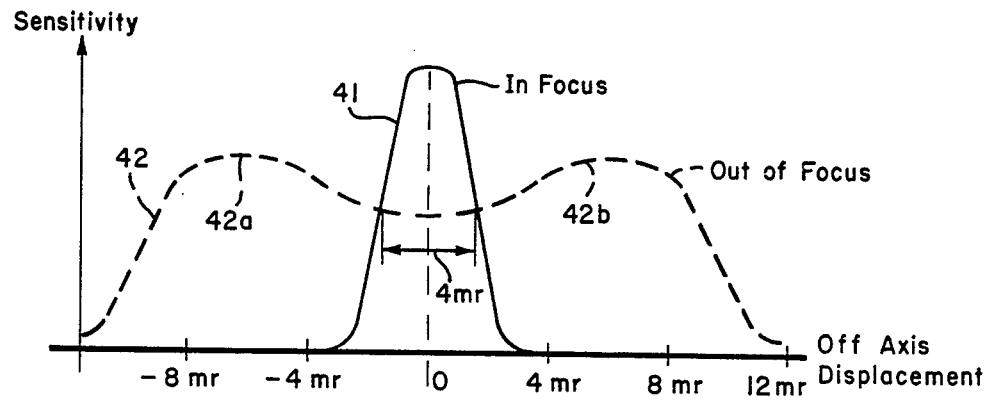

Advantages of the present invention as described in FIG. 1 for facilitating optical alignment and for maintaining control of the system even under inadvertent misalignment conditions will better be understood by referring to FIG. 2.

FIG. 2 illustrates at 41 a plot of the signal sensitivity as a function of alignment of the optical axis A-A with the transmitted signal direction. It will be noted that the signal 41 peaks when there is precise alignment of the axes in question; that is, there is no positive or negative off-axis displacement.

However, it will also be noted in FIG. 2 that with the in-focus condition, any slight off-axis displacement results in a fairly sharp drop in sensitivity, this sensitivity dropping to half its value at approximately two milliradians on either side of the on axis condition and thence to approximately zero for deviations more than four milliradians.

The foregoing sensitivity characteristic with fairly steep sides makes the auto-focus subroutine operation described with respect to FIG. 1 particularly useful in initially aligning the optical receiver. Thus, there is provided means for holding the attenuation networks 27 and 25 fixed when the output signal level is below the given high threshold level. The self-focus subroutine means automatically will maximize the received signal so that in the initial alignment, the operator need not be concerned with the focus variable. Rather, it is a simple matter to first align the axis in elevation and observe a peaking of the signal and then correct the alignment in azimuth, again observing for a peaking of the signal.

Referring once again to FIG. 2, there is illustrated by the dashed line 42 the out-of-focus sensitivity of the signal wherein it will be noted that essentially two out-of-focus peaks are exhibited for misalignments to the left and right of the on axis condition at 42a and 42b.

The foregoing characteristic can be taken advantage of in the present invention by utilizing the auto-focus subroutine means in the logic control system to track one of the out-of-focus peaks in the event that the receiver were inadvertently knocked off-axis as a consequence of a shift in a support structure or high wind or the like. Thus, because of the large available signal strengths normally inherent in optical systems, the signal strength exhibited at the out-of-focus peak portion illustrated in FIG. 2 can be readily detected and tracked to provide again an optical signal and thus maintain operation of the receiver until such time as a proper alignment check is again conducted.

In the absence of the automatic focusing control of this invention, should the receiver be knocked off axis while in a fixed focus, the signal would be entirely lost and realignment operations would have to be conducted.

From all of the foregoing, it will be evident that the present invention has provided an electro-mechanical control means for a space communication receiver wherein problems associated with change of focal length as a consequence of thermal conditions or accidental misalignment are avoided by the self-focus subroutine feature and wherein this same feature in conjunction with automatic gain control attenuating networks provides for a very wide range automatic gain control system.

Additionally, the drive means automatically responsive to appropriate signals from the logic control means to adjust the focus solves problems of proper solar radiation protection by defocusing in extreme cases. Finally, problems associated with defrosing and defogging can easily be solved without concern as to such thermal effects on the lens.

A greatly improved space communication receiver system is thus provided.

While a specific embodiment of this invention has been described in conjunction with FIG. 1, it will be understood that minor variations can be effected without falling outside the scope and spirit of this invention. The space communication receiver is therefore not to be thought of as limited to the specific structure set forth as an illustrative example.

I claim:

1. An electro-mechanical control means for a space communication receiver wherein the receiver includes a lens and a photodetector spaced along the optical axis of the lens, said photodetector providing a photodetector signal in response to light from the lens falling on the photodetector, said electro-mechanical control means including, in combination:
   (a) drive means for changing the distance between said lens and photodetector as measured along said optical axis to thereby shift the position of the focal point of radiation passing through said lens relative to said photodetector;
   (b) signal level detecting means for providing an output signal level in response to said photodetector signal; and
   (c) logic control means connected between said signal level detecting means and said drive means, said logic control means including self-focus subroutine means responsive to said output signal level to operate said drive means in a direction to move the focal point of said lens closer to said photodetector to increase the photodetector signal and thereby increase said output signal level, said self-focus subroutine means continuing to operate the drive means in the same direction until said output signal level starts to decrease at which point the drive means is operated in a reverse direction so that the drive means automatically focuses the radiation from the lens onto the photodetector by seeking the peak signal to provide a maximum output signal to noise ratio so long as said output signal level is below a given high threshold signal level defined within said logic control means.

2. The subject matter of claim 1, including attenuator network means connected between said photodetector and signal level detecting means, and responsive to said logic control means to attenuate said photodetector signal whenever said output signal level exceeds said given high threshold signal level to thereby provide automatic gain control.

3. The subject matter of claim 2, including bias control means connected between said photodetector and logic control means and responsive to an increase in said output signal level above said given high threshold signal level after maximum attenuation has been introduced by said attenuator network means to reduce the gain of said photodetector until said output signal level is brought below said high threshold signal level.

4. The subject matter of claim 3, wherein said logic control means is responsive to said output signal level exceeding said high threshold signal level after maximum attenuation has been introduced by said attenuator network means and after maximum bias to minimize the gain of said photodetector has been introduced to operate said drive means in a manner to defocus the radiation falling on said photodetector thereby reducing said photodetector signal until said output signal level falls below said high threshold signal level, said logic control means further defining a given low threshold signal level such that should said output signal level fall below said low threshold signal level, said drive means, bias control means and attenuator network means will be actuated by said logic control means to operate sequentially in reverse directions as required to bring the output signal level above said given low threshold signal level, whereby the output signal level is automatically maintained within a signal band defined by the given high and low threshold signal levels.

5. The subject matter of claim 3, including solar energy protection means connected between said photodetector and said logic control means and responsive to the d-c component of said photodetector signal, said bias control means being controlled by said logic control means to decrease the gain of said photodetector whenever said d-c component exceeds a given d-c signal level, said drive means automatically being operated to defocus radiation from said lens on said photodetector if said d-c component is still higher than said given d-c signal level after said bias control means has provided maximum bias to minimize the gain of said photodetector.

6. The subject matter of claim 1, including heater means adjacent to said lens; heater control means connected between said heater means and said logic control means; temperature sensing means adjacent to said lens and connected to said logic control means; and ambient temperature input means to said logic control means, said logic control means being responsive to said ambient temperature and the sensed temperature from said temperature sensing means to operate said heater control means in a manner to maintain a given relationship between said sensed temperature at the lens and the ambient temperature to inhibit the condensation of moisture on said lens and thus function as de-fogging and defrosting means.

7. The subject matter of claim 1, in which said lens is a Fresnel lens and wherein changes in the focal length of said lens as a consequence of variations in ambient temperature are automatically compensated for by said self-focus subroutine means.

8. The subject matter of claim 2, including means for holding said attenuator network means fixed when said output signal level is below said given high threshold level, said self-focus subroutine means automatically maximizing the received signal so that initial alignment of said optical axis with the transmitted signal in both azimuth and elevation can be easily carried out by simply observing when the received output signal peaks.

9. The subject matter of claim 1, in which said self-focus subroutine means is automatically responsive to inadvertent misalignment of said optical axis with the transmitted signal resulting in an out-of-focus condition to maximize the received signal in the photodetector so that operation of the system can still be maintained.

* * * * *